US012674374B2

(12) United States Patent
Glennie

(10) Patent No.: US 12,674,374 B2
(45) Date of Patent: Jul. 7, 2026

(54) WELL TOOL ACTUATION UPON PRESSURE DECREASE

(71) Applicant: WEATHERFORD TECHNOLOGY HOLDINGS, LLC, Houston, TX (US)

(72) Inventor: James Glennie, Oldmeldrum (GB)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 0 days.

(21) Appl. No.: 18/733,158

(22) Filed: Jun. 4, 2024

(65) Prior Publication Data

US 2025/0361790 A1 Nov. 27, 2025

Related U.S. Application Data

(60) Provisional application No. 63/650,612, filed on May 22, 2024.

(51) Int. Cl.
*E21B 34/10* (2006.01)
*E21B 23/04* (2006.01)
(Continued)

(52) U.S. Cl.
CPC ........ *E21B 34/101* (2013.01); *E21B 23/0412* (2020.05); *E21B 23/042* (2020.05);
(Continued)

(58) Field of Classification Search
CPC ...... E21B 34/10; E21B 34/101; E21B 34/102; E21B 34/103; E21B 34/00; E21B 34/06;
(Continued)

(56) References Cited

U.S. PATENT DOCUMENTS 7,775,283 B2 8/2010 Coronado et al.
9,080,404 B2 7/2015 Kalb et al.
(Continued)

FOREIGN PATENT DOCUMENTS

CA 2899885 A1 9/2014
WO 2011/071670 A2 6/2011

OTHER PUBLICATIONS

Baker Hughes, "Equalizer Select AICD enabled production across 8600-ft open hole, saved $1.3 million USD," case study, 1 page, dated 2020.

(Continued)

*Primary Examiner* — George S Gray
(74) *Attorney, Agent, or Firm* — SMITH IP SERVICES, P.C.

(57) ABSTRACT

A well tool can include a well tool component that actuates in response to application of pressure to the well tool component, and an actuator in fluid communication with the well tool component. The actuator can include an input line configured for connection to a fluid pressure source, a valve including opposing piston areas connected to the input line, and a flow restrictor connected between one of the piston areas and the input line. A method of actuating a well tool in a subterranean well can include increasing fluid pressure in the well, the increased fluid pressure being communicated to an actuation line of an actuator, and decreasing the fluid pressure in the well, the increased fluid pressure in the actuation line causing a valve of the actuator to open when the fluid pressure is decreased.

20 Claims, 7 Drawing Sheets

(51) Int. Cl.

| | |
|---|---|
| ***E21B 33/128*** | (2006.01) |
| ***E21B 34/08*** | (2006.01) |
| ***F15B 1/04*** | (2006.01) |

(52) U.S. Cl.
CPC ............ *F15B 1/04* (2013.01); *E21B 33/1285* (2013.01); *E21B 34/08* (2013.01); *E21B 2200/06* (2020.05)

(58) Field of Classification Search
CPC ........ E21B 34/063; E21B 34/08; E21B 23/04; E21B 23/0412; E21B 23/042; E21B 33/1285; E21B 33/12; E21B 2200/06; F15B 1/04
See application file for complete search history.

(56) References Cited

U.S. PATENT DOCUMENTS

| | | | | |
|---|---|---|---|---|
| 9,121,247 | B2 | 9/2015 | George et al. | |
| 9,121,252 | B2 | 9/2015 | George et al. | |
| 9,217,309 | B2 | 12/2015 | Kalb et al. | |
| 9,359,864 | B2 | 6/2016 | Harris et al. | |
| 9,816,352 | B2 | 11/2017 | Pickle et al. | |
| 10,138,725 | B2 | 11/2018 | George et al. | |
| 10,156,124 | B2 | 12/2018 | Guzman et al. | |
| 10,337,285 | B2 | 7/2019 | Kellner | |
| 10,364,647 | B2 | 7/2019 | Sargent et al. | |
| 11,261,682 | B2 | 3/2022 | Angman et al. | |
| 11,428,073 | B2 | 8/2022 | Mackay | |
| 11,702,904 | B1 | 7/2023 | Anton et al. | |
| 2003/0034899 | A1* | 2/2003 | Zisk, Jr. .................. | E21B 23/06 340/854.3 |
| 2004/0226720 | A1 | 11/2004 | Schultz et al. | |
| 2016/0258252 | A1* | 9/2016 | Fripp ...................... | E21B 34/14 |
| 2018/0142530 | A1* | 5/2018 | Bane ...................... | E21B 34/10 |

OTHER PUBLICATIONS

Baker Hughes, "MTV hydraulically actuated device," webpage, 3 pages, accessed May 10, 2024.
Weatherford, "FloReg Inflow Control Device (ICD)," product brochure, 12 pages, dated 2010.
Baker Hughes, "4-1/2" CF Equalizer Helix with MTV (Multi Tasking Valve)," product presentation, dated 2009, 29 pages.
Geodynamics, "SmartStartPLUS," product brochure, dated 2023, 2 pages.
Halliburton, "PetroGuard Screen and Equiflow ICD with Remote-Open Valve," product brochure, dated 2021, 2 pages.
HP Well Screen, "Data Sheet A1400837," product data sheet, undated, 1 page.
HP Well Screen, "Dissolvable Plugged Technology," product brochure, dated 2021, 13 pages.
Innovex Downhole Solutions, "To Activate Innovex Full-bore Masterflow ICDs (D) during the Clean Out Run:," user guide, dated 2018, 2 pages.
Innovex, Orio 3D Toe Sleeve product brochure, dated Sep. 2021, 1 page.
Schlumberger, "ResFlow Inflow Control Device," product brochure, dated 2015, 4 pages.
International Search Report with Written Opinion issued May 14, 2025 for PCT Patent Application No. PCT/IB2025/052780, 10 pages.

* cited by examiner

WELL TOOL ACTUATION UPON PRESSURE DECREASE

CROSS-REFERENCE TO RELATED APPLICATION

This application claims the benefit of the filing date of U.S. provisional application No. 63/650,612 filed on 22 May 2024. The entire disclosure of the prior application is incorporated herein by this reference for all purposes.

BACKGROUND

This disclosure relates generally to equipment utilized and operations performed in conjunction with a subterranean well and, in examples described below, more particularly provides for actuation of a well tool upon a sufficient increase and subsequent reduction of fluid pressure in a well.

Various types of well tools can be actuated by increasing fluid pressure in a well. For example, a packer may be set or a sliding sleeve valve may be opened in response to application of a predetermined pressure level in a tubular string. Some well tools may be actuated by application of increased pressure to an annulus surrounding a tubular string.

Therefore, it will be readily appreciated that improvements are continually needed in the art of designing, constructing and utilizing well tools that are actuated by pressure. The disclosure below provides such improvements to the art, which improvements may be used with a variety of different types of well tools and a variety of different types of well environments and configurations.

DETAILED DESCRIPTION

Figure 1:
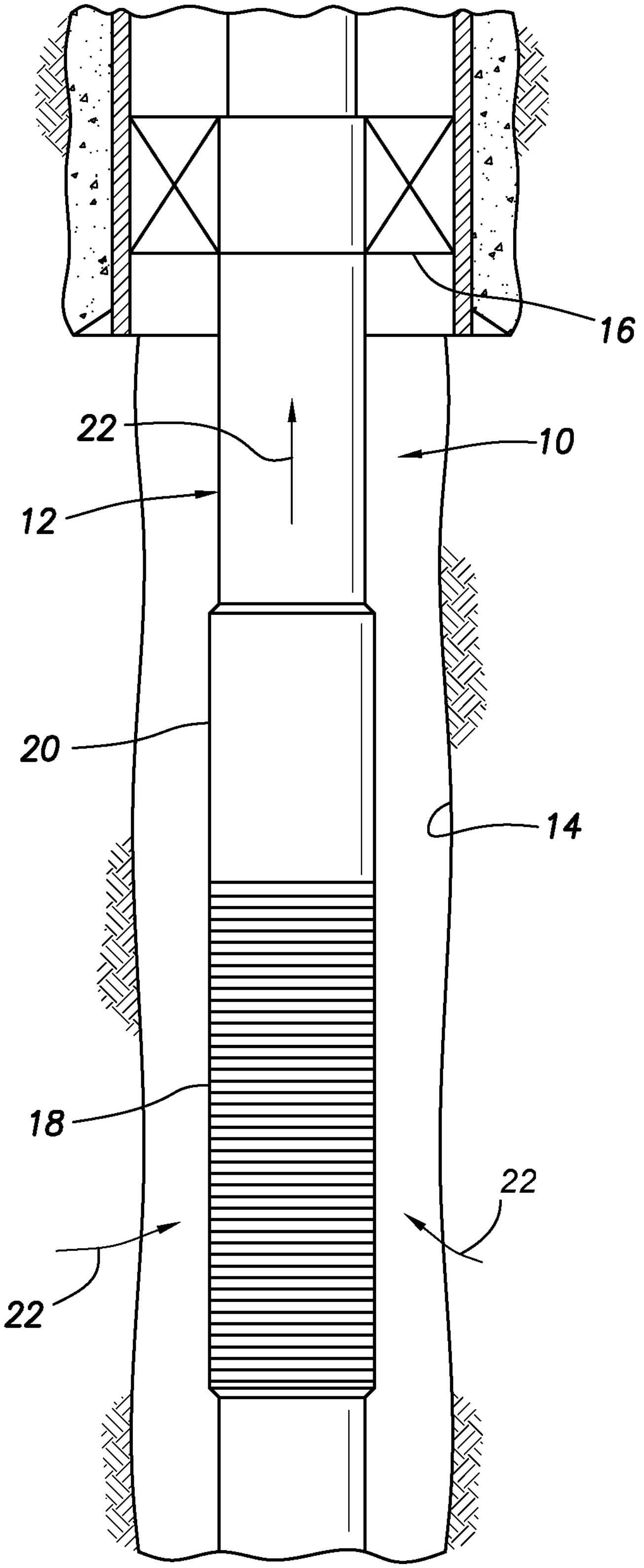
FIG. 1 is a representative partially cross-sectional view of an example of a well system and associated method which can embody principles of this disclosure.

Representatively illustrated in FIG. 1 is a system 10 for use with a subterranean well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a tubular string 12 is positioned in a wellbore 14. The tubular string 12 is a production tubing string, but in other examples the tubular string could comprise drill pipe, liner, casing, an injection string, coiled tubing, conduit or any other type of tubular string.

As depicted in FIG. 1, a packer 16 and a well screen 18 are connected in the tubular string 12. The packer 16 is set in a cased section of the wellbore 14, and the well screen 18 is positioned in an uncased section of the wellbore. However, it is not necessary in keeping with the scope of this disclosure for any particular well tool to be positioned in a cased or uncased section of a wellbore.

In the FIG. 1 example, an inflow control valve 20 is connected in the tubular string 12. The inflow control valve 20 controls flow of well fluids 22 from the well screen 18 into the tubular string 12 for production to a surface of the well. The inflow control valve 20 is initially closed when the tubular string 12 is deployed into the wellbore 14, and then the inflow control valve is opened when it is desired to produce the fluids 22 through the well screen 18 into the tubular string 12.

In some examples, the inflow control valve 20 and the well screen 18 may be combined into a single well tool, instead of being considered separate well tools. The well screen 18/inflow control valve 20 is one example of a type of well tool that can incorporate the principles of this disclosure, but it should be understood that a wide variety of other different types of well tools (such as, packers, samplers, tester valves, frac valves, etc.) can benefit from the principles disclosed herein.

If the packer 16 is a hydraulically set packer, which is set in response to increased pressure applied to an interior of the tubular string 12, then the initial closed configuration of the inflow control valve 20 is desirable for applying the increased pressure to set the packer. After the packer 16 is set, the inflow control valve 20 can be opened to allow flow of the well fluids 22 into the tubular string 12 via the well screen 18.

For a variety of different reasons, it is preferable for the inflow control valve 20 (and other types of well tools) to not be actuated when a relatively high pressure level has been applied in the well. One reason, in the case of the inflow control valve 20, is that the relatively high pressure would immediately be transmitted outward through the well screen 18, possibly damaging the well screen and/or an earth formation surrounding the wellbore 14. Seals can leak or be damaged when high pressure differentials are applied to the seals, particularly if the seals seal against moving well tool components. Well tool components can also be damaged, for example, due to impact loading caused by high pressure differentials. Other reasons exist, as well, depending on the type of well tool being actuated. For example, it is typically desirable for a packer to be set relatively slowly, to allow its seal elements to fully and uniformly compress.

In the FIG. 1 example, the inflow control valve 20 includes features that enable the valve to be actuated from its closed configuration to its open configuration when fluid pressure in the tubular string 12 has been increased and then reduced. In this manner, the packer 16 can be set by increasing the pressure in the tubular string 12 (and/or other well tools in the tubular string can be actuated by the increased pressure), and then the inflow control valve 20 can be opened by decreasing the pressure in the tubular string.

Figure 2A:
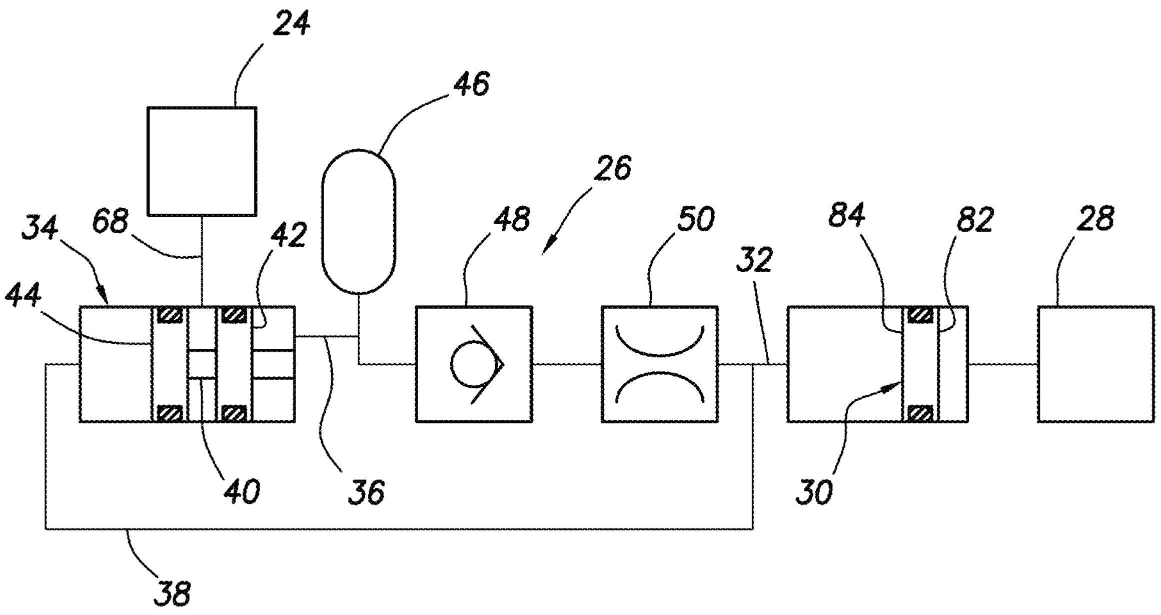
FIGS. 2A & B are representative hydraulic schematics for an example of a well tool and actuator in respective run-in and actuated configurations.

Referring additionally now to FIGS. 2A & B hydraulic schematics for an example of a well tool 24 and actuator 26 in respective run-in and actuated configurations are representatively illustrated. For clarity and convenience, the well tool 24 and actuator 26 are described below as they may be used in the FIG. 1 system 10 and method, but the well tool and actuator may be used in other systems and methods in keeping with the scope of this disclosure.

When used in the FIG. 1 system 10 and method, the well tool 24 and actuator 26 correspond to the packer 16 or the inflow control valve 20. However, the well tool 24 and actuator 26 may correspond to other types of well equipment in other examples.

In some examples, the well tool 24 and actuator 26 may be combined into a single item of well equipment, instead of being considered separate elements. The scope of this disclosure encompasses a variety of different configurations and combinations of well tools and actuators therefor, whether or not the well tools and actuators are combined or considered separate elements.

In the FIG. 2A example, the actuator 26 is connected to a source of fluid pressure 28. When used in the FIG. 1 system 10 and method, the fluid pressure source 28 is the interior of the tubular string 12, which may be connected, for example, to a pump at the surface. However, other fluid pressure sources (such as, an annulus, a control line, a downhole pump, etc.) may be used in other examples.

To isolate the actuator 26 from possible debris, contamination, etc., in the fluid pressure source 28, a piston 30 is connected between the fluid pressure source and an input line 32 of the actuator. The piston 30 has a piston area 82 exposed to the fluid pressure source 28, and an opposing piston area 84 connected to the input line 32.

In this example, a clean hydraulic fluid is used on the actuator 26 side of the piston 30. Other types of fluids may be used in other examples or, if the fluid supplied from the fluid pressure source 28 is sufficiently clean, the piston 30 may not be used.

In the actuator 26, the input line 32 is connected to a valve 34 via an actuation line 36 and a retainer line 38. The valve 34 includes a piston 40 having opposing piston areas 42, 44. The piston area 42 is exposed to fluid pressure in the actuation line 36, and the piston area 44 is exposed to fluid pressure in the retainer line 38.

Initially, the valve 34 is in a closed configuration, as depicted in FIG. 2A. However, when fluid pressure in the actuation line 36 exceeds fluid pressure in the retainer line 38, the piston 40 will be displaced to an open position (see FIG. 2B), in which the fluid pressure in the actuation line 36 will be communicated to the well tool 24 (or the well tool will be otherwise actuated), as described more fully below.

In the FIG. 2A example, the actuator 26 includes an accumulator 46, a check valve 48 and a flow restrictor 50 connected between the input line 32 and the valve 34. The accumulator 46, check valve 48 and flow restrictor 50 may be connected in various different arrangements between the input line 32 and the valve 34, but preferably the accumulator is connected between the check valve 48 and the valve 34 (although the flow restrictor may be connected on either side of the check valve, the flow restrictor and the check valve may be combined into a single element, etc.).

The accumulator 46 may be any type of accumulator capable of storing and releasing fluid when desired. In some examples, the accumulator 46 may be a spring- or fluid pressure-biased accumulator. In other examples, the accumulator 46 may simply be a sufficient fluid volume to actuate the well tool 24 when the valve 34 is opened, as described more fully below. With the accumulator 46 connected between the input line 32 and the valve 34, a fluid volume between the input line 32 and the piston area 42 is substantially greater than a fluid volume from the input line 32 to the piston area 44.

Note that the scope of this disclosure is not limited to any particular combination, configuration or arrangement of elements of the actuator 26. For example, use of the check valve 34 is not essential, since a sufficient restriction to flow between the input line 32 and the actuation line 36 will enable the pressure applied to the piston area 42 to lag behind the pressure applied to the piston area 44. Similarly, use of a separate accumulator 46 is not essential, since a sufficient volume of fluid may be contained in the actuation line 36 (and the valve 34 or other components of the actuator 26) to open the valve 34, and to actuate the well tool 24 when the valve 34 is opened.

In operation in the FIG. 1 system 10 and method, fluid pressure delivered by the fluid pressure source 28 is increased. For example, fluid pressure in the tubular string 12 is increased to set the packer 16. This increased pressure is applied to the piston 30 and is transmitted to the input line 32 of the actuator 26.

The increased pressure applied to the input line 32 is communicated to both of the actuation line 36 and the retainer line 38. However, due to the restriction to flow caused by the flow restrictor 50, the increased pressure is transmitted first to the piston area 44 of the valve 34 via the retainer line 38, before the increased pressure is transmitted to the piston area 42 via the actuation line 36. Stated differently, the increased pressure applied to the piston area 42 lags behind the increased pressure applied to the piston area 44. Thus, the retainer line 38 acts to retain the piston 40 in its FIG. 2A closed position as increased fluid pressure is applied to the input line 32. A separate retainer device (such as, a shear pin, shear ring, shear screw, latch, collets, etc.) may also be used to releasably retain the piston 40 in the closed position, as described more fully below.

Eventually, the increased pressure applied to the input line 32 is also applied equally to the piston areas 42, 44. At this point, the piston 40 is pressure balanced and remains in its closed position.

Since the accumulator 46 is connected to the actuation line 36, the increased fluid pressure will also be applied to the accumulator. Thus, the accumulator 46 is gradually charged with the increased pressure as the increased pressure is applied to the actuation line 36 via the flow restrictor 50 and check valve 48.

In the FIG. 1 system 10 and method, after the packer 16 is set the fluid pressure in the interior of the tubular string 12 is decreased. It is desired for the inflow control valve 20 to open when the fluid pressure has been reduced to a predetermined level.

In the FIG. 2A example, the fluid pressure applied from the fluid pressure source 28 to the piston 30 is decreased. The decreased fluid pressure is communicated to the input line 32.

The retainer line 38 transmits the decreased fluid pressure from the input line 32 to the piston area 44 of the valve 34. Thus, the fluid pressure applied to the piston area 44 is relatively quickly reduced.

However, the check valve 48 prevents release of fluid from the accumulator 46 back to the input line 32. Thus, the previously increased fluid pressure remains applied to the piston area 42 as the fluid pressure applied to the piston area 44 is reduced.

In this manner, a pressure differential is applied from the piston area 42 to the piston area 44, thereby causing the piston 40 to displace to its open position. As mentioned above, a retainer device may be used to retain the piston 40 in its open position, until the pressure differential from the piston area 42 to the piston area 44 reaches a predetermined level.

When the piston 40 displaces to its open position, the increased fluid pressure stored in the accumulator 46 will be applied to the well tool 24 via a line 68 to actuate the well tool. Thus, preferably the accumulator 46 has sufficient volume to store fluid at increased pressure to actuate the well tool 24 (for example, to displace a piston or a sliding sleeve of the well tool).

Note that it is not necessary for the well tool 24 to be connected directly to the valve 34, in order for the well tool to be actuated due to opening of the valve 34. In the FIG. 2B example, the well tool 24 is connected between the fluid pressure source 28 and the input line 32 of the actuator 26. The well tool 24 includes the piston 30, and the well tool is actuated when the piston 30 displaces due to the opening of the valve 34.

Figure 2B:
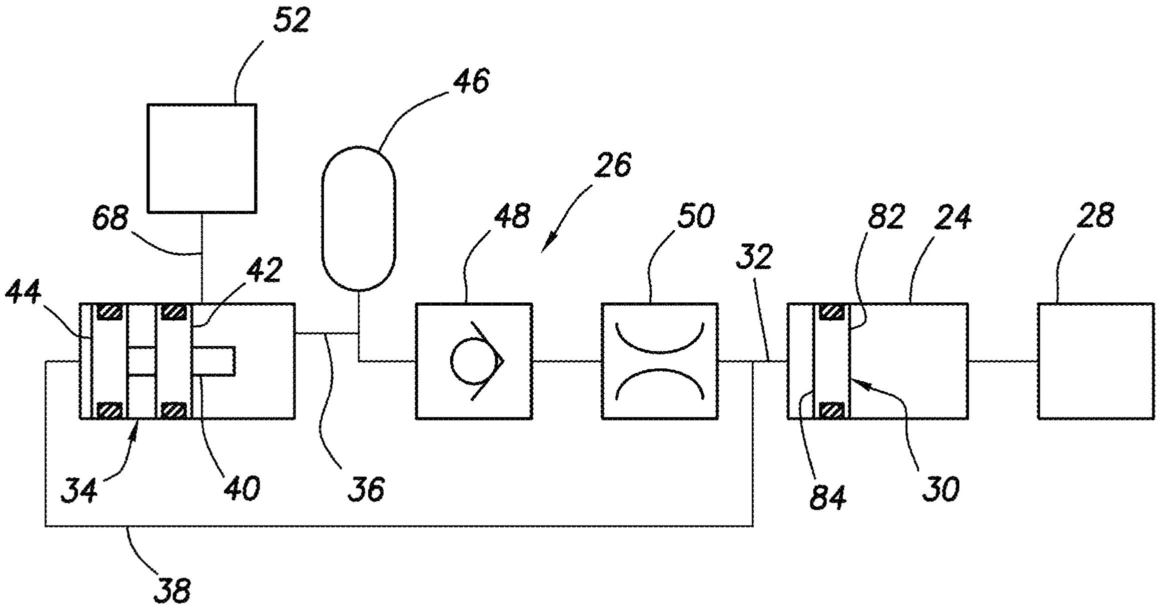

In the FIG. 2B example, a relatively low pressure chamber 52 (such as, an atmospheric chamber) is connected to the valve 34. When the valve 34 is opened as described above, fluid flows from the actuation line 36 and the accumulator 46 into the chamber 52 via the line 68.

Due to the loss of fluid volume into the chamber 52, the piston 30 of the well tool 24 is displaced as depicted in FIG. 2B. This displacement of the piston 30 may be used to actuate various different types of well tools (such as, to set a packer, open or close a valve, etc.).

Figure 3:
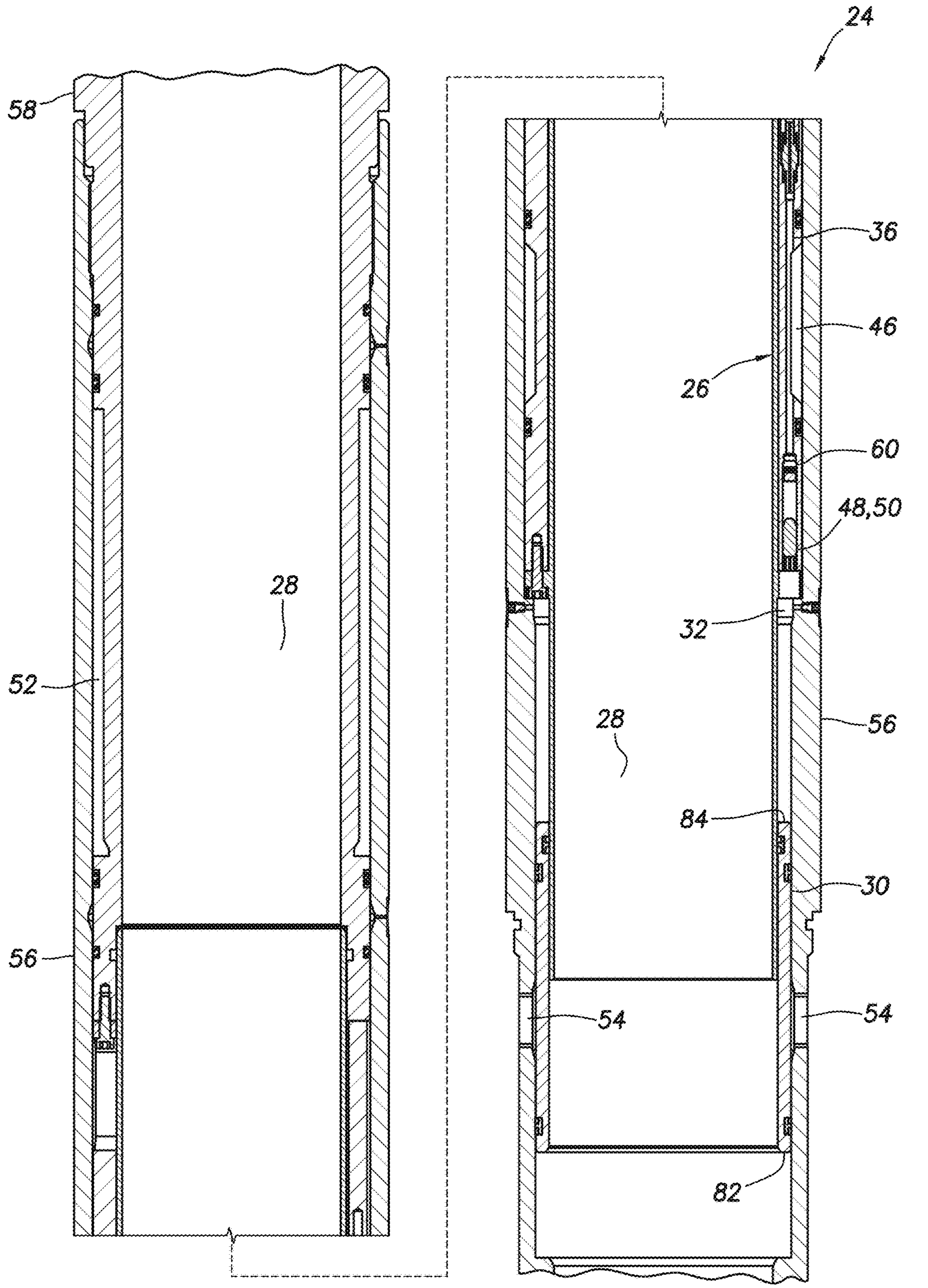
FIG. 3 is a representative cross-sectional view of another example of a well tool and actuator in a run-in configuration.

Referring additionally now to FIG. 3, a cross-sectional view of another example of the well tool 24 and actuator 26 in a run-in configuration is representatively illustrated. The FIG. 3 example operates in a manner similar to the FIG. 2B example, and so the reference numbers used for the FIG. 2B example are also used for the FIG. 3 example.

As depicted in FIG. 3, the actuator 26 is incorporated into the well tool 24, which is in the form of a sliding sleeve-type inflow control valve. The piston 30 is in the form of a sliding sleeve which initially blocks flow through ports 54 that receive fluid from a well screen (such as, the FIG. 1 well screen 18).

The piston 30 is slidingly and sealingly received in an outer housing 56 configured for connection in a tubular string (such as, the FIG. 1 tubular string 12). The fluid pressure source 28 comprises an interior flow passage of the well tool 24, which would form a part of the interior of the tubular string 12 in the FIG. 1 example. The chamber 52 is formed in an annulus between the outer housing 56 and an upper connector 58 secured in the outer housing.

The check valve 48 and flow restrictor 50 are incorporated into a single element in the FIG. 3 example. A rupture disc 60 is provided to prevent application of increased pressure from the pressure source 28 to the actuation line 36 and accumulator 46 until the increased pressure reaches a predetermined level. The accumulator 46 comprises an annular fluid volume in the outer housing 56.

Figure 4:
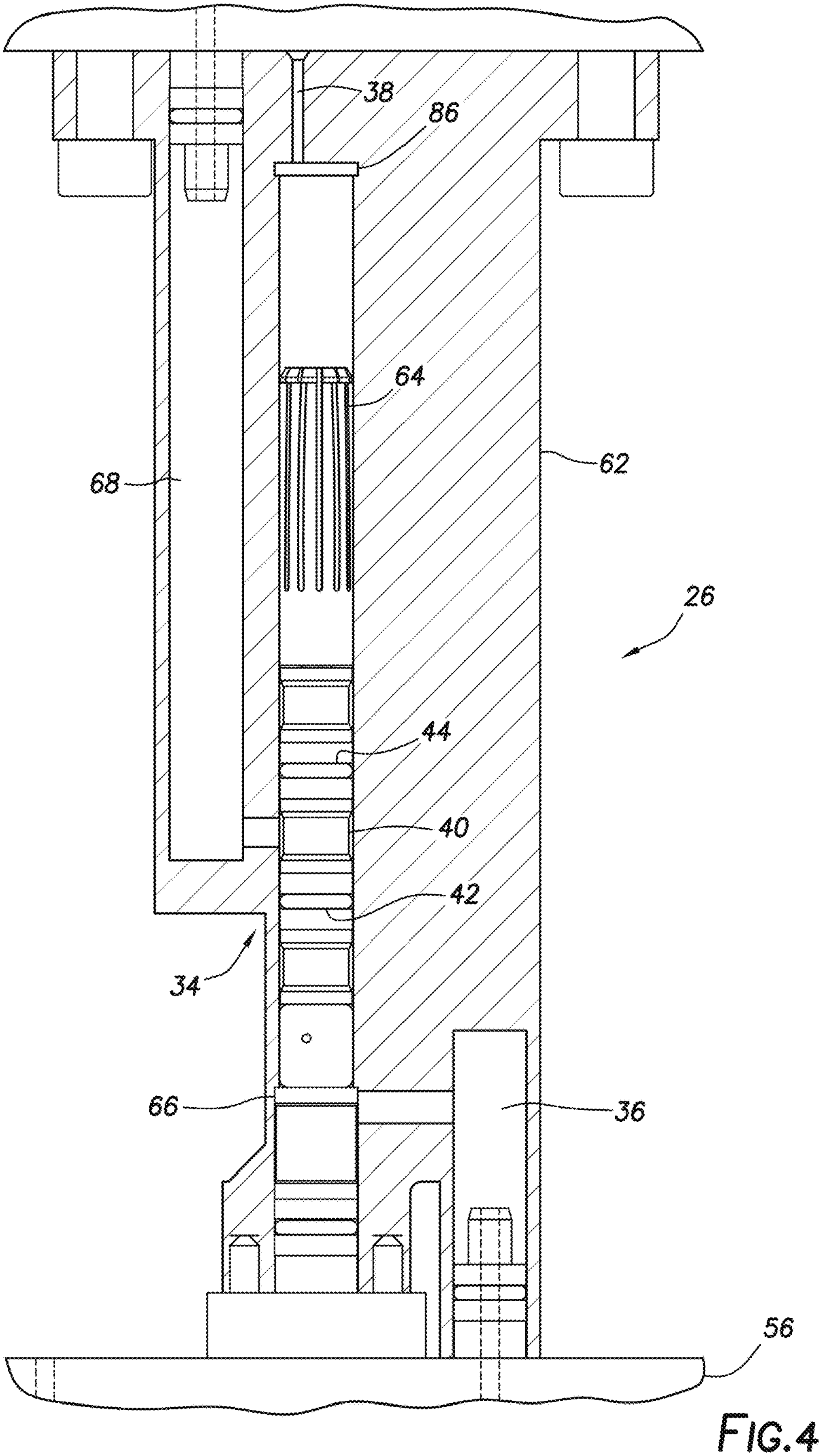
FIG. 4 is a representative partially cross-sectional view of an example of the FIG. 3 actuator in the run-in configuration.

Referring additionally now to FIG. 4, a partially cross-sectional view of an example of the FIG. 3 actuator 26 in the run-in configuration is representatively illustrated. FIG. 4 depicts only a 3-D printed manifold 62 section of the actuator 26, with the manifold comprising the valve 34 therein.

As depicted in FIG. 4, the valve 34 is in its closed configuration. A set of collets 64 are provided to retain the piston 40 in its open position as described more fully below. In addition, a retainer device 66 in the form of a shear ring releasably secures the piston 40 against displacing to the open position, until a predetermined pressure differential is applied from the piston area 42 to the piston area 44.

The actuation line 36 and the retainer line 38 are both connected to the input line 32, with the check valve 48 and flow restrictor 50 being connected between the valve 34 and the input line as described above for the FIGS. 2A & B examples. In addition, the line 68 is formed in the manifold 62 for communication with the chamber 52 (see FIG. 3). The retainer line 38 is relatively unrestricted between the input line 32 and the valve 34, and comprises a drilled hole not visible in FIGS. 3-6.

Figure 5:
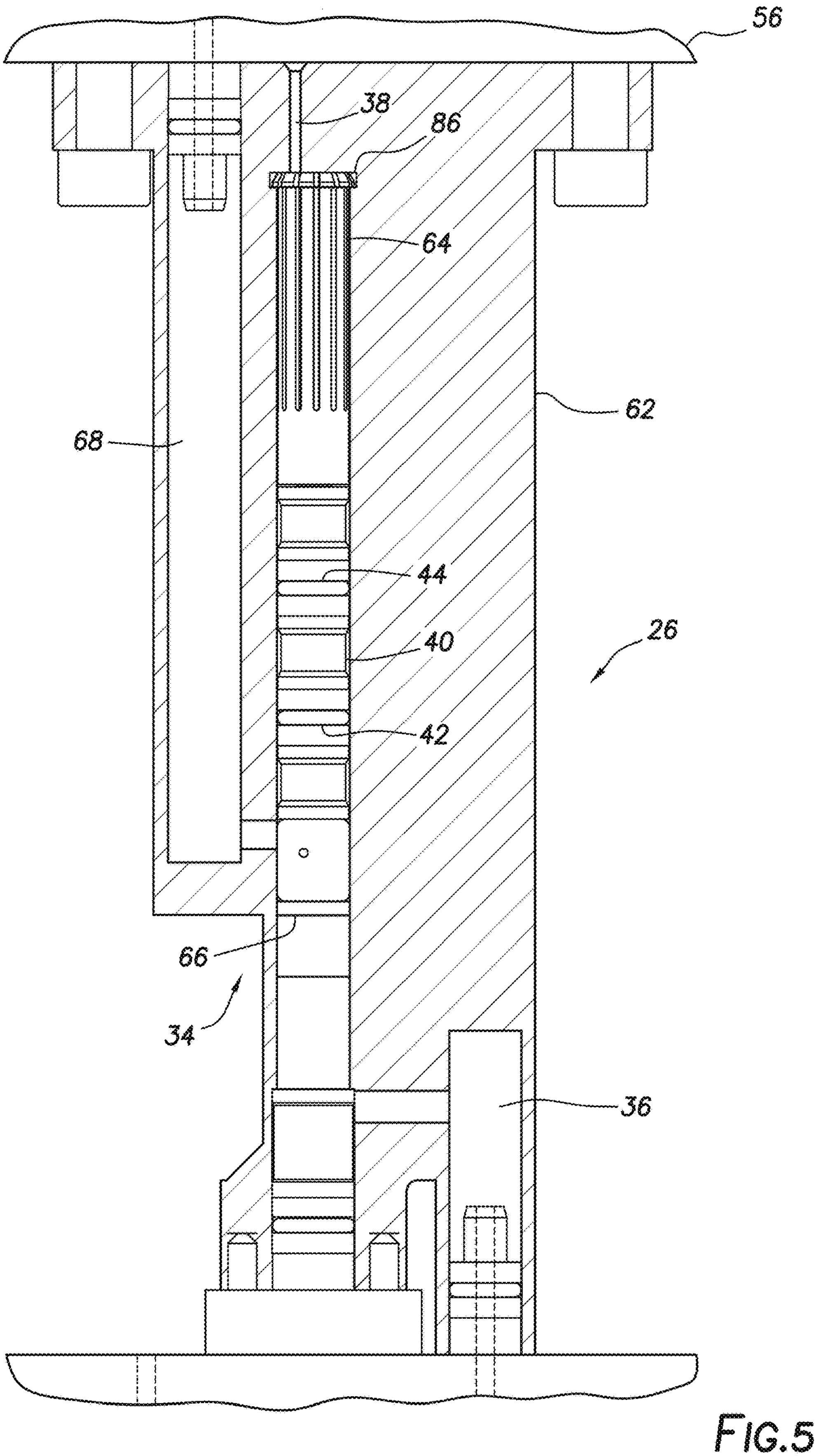
FIG. 5 is a representative partially cross-sectional view of the FIG. 3 actuator in an actuated configuration.

Referring additionally now to FIG. 5, a partially cross-sectional view of the FIG. 3 actuator manifold 62 in an actuated configuration is representatively illustrated. In this view, a sufficient pressure differential has been applied from the piston area 42 to the piston area 44 to shear the retainer device 66. The collets 64 are now received in an annular recess 86 to prevent the piston 40 from displacing back to its closed position.

The piston 40 is displaced to its open position by the differential pressure. In the open position of the piston 40, fluid in the actuation line 36 is flowed to the chamber 52 via the line 68 in the manifold 62.

Figure 6:
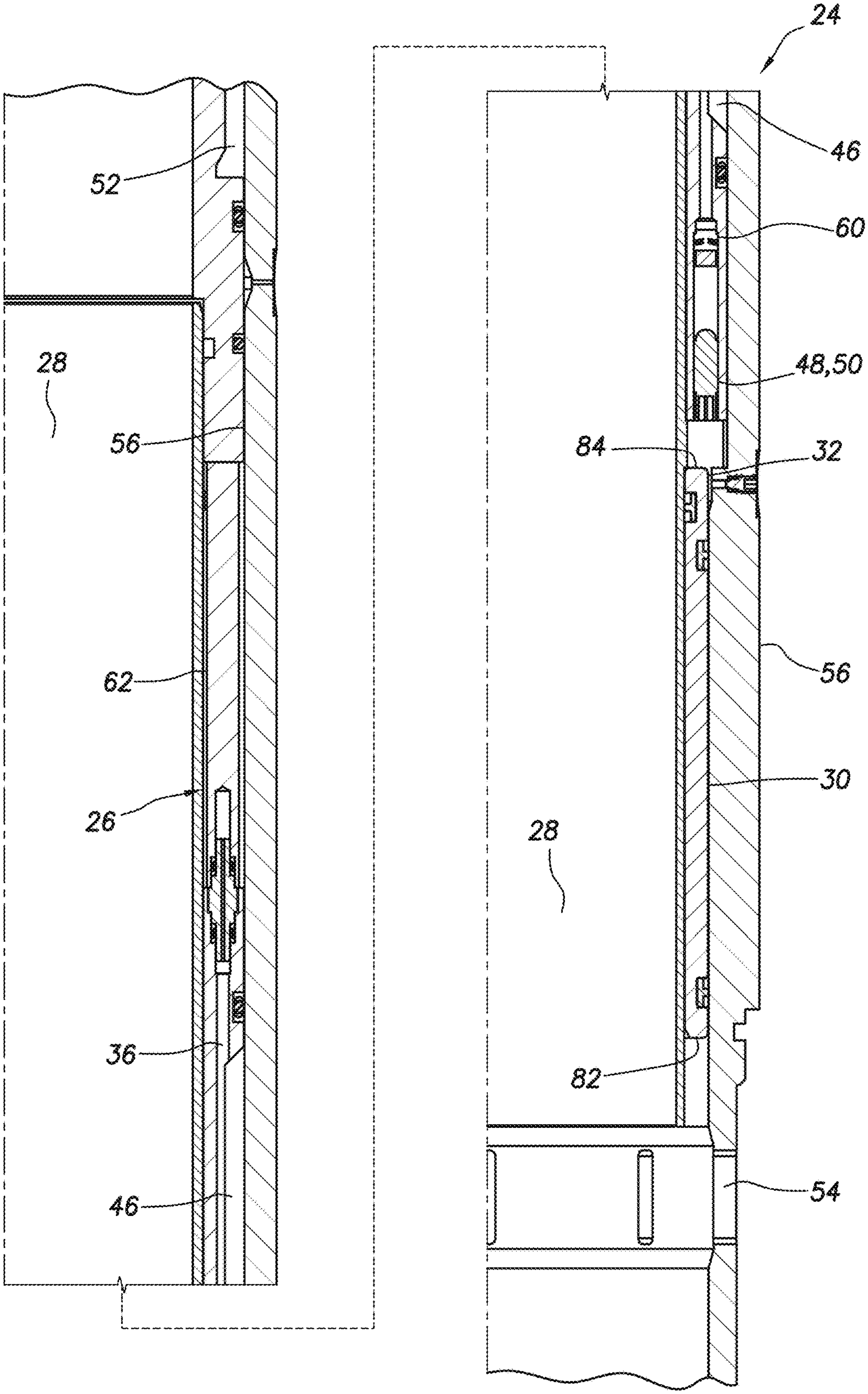
FIG. 6 is a representative cross-sectional view of the FIG. 3 well tool and actuator in the actuated configuration.

Referring additionally now to FIG. 6, a cross-sectional view of the FIG. 3 well tool 24 and actuator 26 in the actuated configuration is representatively illustrated. In this configuration, the rupture disc 60 has been ruptured by the increased pressure applied via the fluid pressure source 28. The piston 40 (not visible in FIG. 6) has been displaced to its open position (see FIG. 5), so that fluid can flow from the actuation line 36 and accumulator 46 to the chamber 52.

As a result, the piston 30 has displaced upward to its open position. Fluid flow is now permitted through the ports 54.

Figure 7:
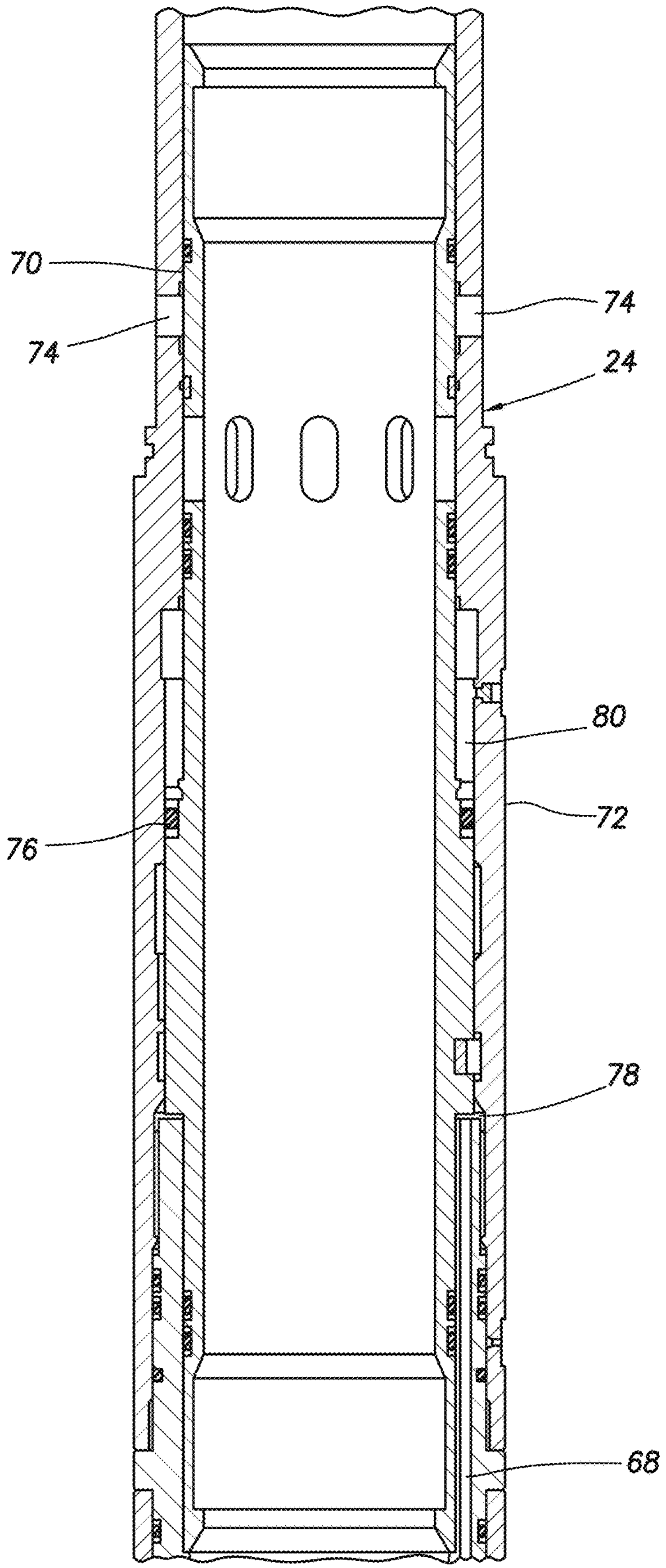
FIG. 7 is a representative cross-sectional view of another example of a well tool in a run-in configuration.

FIG. 7 is a representative cross-sectional view of another example of a well tool 24 and actuator 26 in a run-in configuration. The FIG. 7 example operates in a manner similar to the FIG. 2A example, and so the reference numbers used for the FIG. 2A example are also used for the FIG. 7 example.

In the FIG. 7 example, the well tool 24 is in the form of a sliding sleeve-type valve. A sliding sleeve 70 is slidingly and sealingly received in an outer housing 72. In the run-in configuration, the sleeve 70 is in a closed position in which flow through ports 74 in the outer housing 72 are blocked by the sleeve. In some examples, the ports 74 may receive fluid flowed through a well screen (such as, the FIG. 1 well screen 18).

The sliding sleeve 70 has a radially enlarged piston 76 formed thereon, with annular chambers 78, 80 disposed on opposite sides of the piston. The line 68 is in fluid communication with the annular chamber 78.

When the actuator 26 (see FIG. 2A) applies fluid pressure to the line 68 (e.g., when the piston 40 is displaced to its open position as described above), the increased fluid pressure applied to the chamber 78 will cause the sliding sleeve 70 to displace upward to an open position. Fluid flow will then be permitted through the ports 74.

It may now be fully appreciated that the above disclosure provides significant advancements to the art of designing, constructing and utilizing well tools that are actuated by pressure. In examples described above, the well tool 24 can be actuated in response to a decrease in pressure following a pressure increase.

The above disclosure provides to the art a well tool 24 for use with a subterranean well. In one example, the well tool 24 can comprise: a well tool component (such as, the piston/sliding sleeve 30 or the sliding sleeve 70) configured for actuation in response to application of pressure to the well tool component; and an actuator 26 in fluid communication with the well tool component 30, 70. The actuator 26 can comprise: an input line 32 configured for connection to a fluid pressure source 28, a first valve 34 including first and second opposing piston areas 42, 44 connected to the input line 32, and a flow restrictor 50 connected between the first piston area 42 and the input line 32.

The well tool 24 may include a second valve 48 connected between the first piston area 42 and the input line 32, the second valve 48 comprising a check valve. Flow from the input line 32 to the first piston area 42 may be restricted more than flow from the input line 32 to the second piston area 44.

The well tool 24 may include an accumulator 46 connected between the input line 32 and the first piston area 42. A first fluid volume between the input line 32 and the first piston area 42 may be greater than a second fluid volume from the input line 32 to the second piston area 44.

The first and second piston areas 42, 44 may be formed on a piston 40 of the first valve 34. The piston 40 may have a first position in which the well tool component 30, 70 is isolated from the fluid pressure source 28, and a second position in which the well tool component 30, 70 is exposed to fluid pressure from the fluid pressure source 28. The piston 40 may be configured to displace from the first position to the second position when fluid pressure applied to the first piston area 42 is greater than fluid pressure applied to the second piston area 44.

The first and second piston areas 42, 44 may be formed on a piston 40 of the first valve 34. The piston 40 may have a first position in which a chamber 52 of the well tool 24 is isolated from the fluid pressure source 28, and a second position in which the well tool chamber 52 is exposed to fluid pressure from the fluid pressure source 28. The piston 40 may be configured to displace from the first position to the second position when fluid pressure applied to the first piston area 42 is greater than fluid pressure applied to the second piston area 44.

The well tool component may comprise a piston 30 with a third piston area 82 configured for exposure to the fluid pressure source 28, and a second piston area 84 connected to the input line 32.

The above disclosure also provides to the art a method of actuating a well tool 24 in a subterranean well. In one example, the method can comprise: increasing fluid pressure in the well, the increased fluid pressure being communicated to an actuation line 36 of an actuator 26; and decreasing the fluid pressure in the well, the increased fluid pressure in the actuation line 36 causing a first valve 34 of the actuator 26 to open when the fluid pressure is decreased.

The fluid pressure increasing step may comprise charging an accumulator 46 connected to the actuation line 36. The fluid pressure increasing step may comprise flowing fluid through a second valve 48 connected to the accumulator 46. The second valve 48 may comprise a check valve.

The fluid pressure increasing step may comprise flowing fluid through a flow restrictor 50 connected to the actuation line 36. The actuation line 36 may be connected to an input line 32 that is connected to a source 28 of the fluid pressure.

The actuator 26 may comprise a retainer line 38 connected to the input line 32. The fluid pressure decreasing step may comprise decreasing the fluid pressure in the retainer line 38 relative to the fluid pressure in the actuation line 36.

The first valve 34 may comprise a first piston area 42 exposed to the fluid pressure in the actuation line 36, and a second piston area 44 exposed to the fluid pressure in the retainer line 38. The step of causing the first valve 34 to open may comprise applying a predetermined pressure differential from the first piston area 42 to the second piston area 44.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," "upward," "downward," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A well tool for use with a subterranean well, the well tool comprising:

a well tool component configured for actuation in response to application of fluid pressure to the well tool component; and an actuator connected to the well tool component via a fluid line, the actuator comprising:

an input line configured for connection to a fluid pressure source, a first valve including first and second opposing piston areas connected to the input line, and a flow restrictor connected between the first piston area and the input line.

2. The well tool of claim 1, further comprising a second valve connected between the first piston area and the input line, the second valve comprising a check valve.

3. The well tool of claim 1, in which flow from the input line to the first piston area is restricted more than flow from the input line to the second piston area.

4. The well tool of claim 1, further comprising an accumulator connected between the input line and the first piston area.

5. The well tool of claim 1, in which a first fluid volume between the input line and the first piston area is greater than a second fluid volume from the input line to the second piston area.

6. The well tool of claim 1, in which the first and second piston areas are formed on a piston of the first valve, the piston having a first position in which the well tool component is isolated from the fluid pressure source, and a second position in which the well tool component is exposed to fluid pressure from the fluid pressure source.

7. The well tool of claim 6, in which the piston is configured to displace from the first position to the second position when fluid pressure applied to the first piston area is greater than fluid pressure applied to the second piston area.

8. The well tool of claim 1, in which the first and second piston areas are formed on a piston of the first valve, the piston having a first position in which a chamber of the well tool is isolated from the fluid pressure source, and a second position in which the well tool chamber is exposed to fluid pressure from the fluid pressure source.

9. The well tool of claim 8, in which the piston is configured to displace from the first position to the second position when fluid pressure applied to the first piston area is greater than fluid pressure applied to the second piston area.

10. The well tool of claim 1, in which the well tool component comprises a piston with a third piston area configured for exposure to the fluid pressure source, and a second piston area connected to the input line.

11. A method of actuating a well tool in a subterranean well, the method comprising:

connecting an actuator to the well tool via a fluid line;

increasing fluid pressure in the well, the increased fluid pressure being communicated to an actuation line of the actuator; and decreasing the fluid pressure in the well, the increased fluid pressure in the actuation line causing a first valve of the actuator to open when the fluid pressure is decreased, thereby permitting fluid flow through the fluid line and actuating the well tool.

12. The method of claim 11, in which the fluid pressure increasing comprises charging an accumulator connected to the actuation line.

13. The method of claim 12, in which the fluid pressure increasing comprises flowing fluid through a second valve connected to the accumulator.

14. The method of claim 13, in which the second valve comprises a check valve.

15. The method of claim 12, in which the fluid pressure increasing comprises flowing fluid through a flow restrictor connected to the actuation line.

16. The method of claim 15, in which the actuation line is connected to an input line that is connected to a source of the fluid pressure.

17. The method of claim 16, in which the actuator comprises a retainer line connected to the input line.

18. The method of claim 17, in which the fluid pressure decreasing comprises decreasing the fluid pressure in the retainer line relative to the fluid pressure in the actuation line.

19. The method of claim 17, in which the first valve comprises a first piston area exposed to the fluid pressure in the actuation line, and a second piston area exposed to the fluid pressure in the retainer line.

20. The method of claim 19, in which the causing the first valve to open comprises applying a predetermined pressure differential from the first piston area to the second piston area.

* * * * *